United States Patent Office 3,419,462
Patented Dec. 31, 1968

3,419,462
BENZOIN-TYPE COPOLYMERS AND GLASS
FABRIC LAMINATES THEREOF
Rudolf Wehr, Wilmington, Del., assignor to E. I. du Pont
de Nemours and Company, Wilmington, Del., a corporation of Delaware
No Drawing. Original application Dec. 4, 1963, Ser. No.
328,099. Divided and this application Nov. 28, 1967,
Ser. No. 701,506
3 Claims. (Cl. 161—198)

ABSTRACT OF THE DISCLOSURE

This invention relates to benzoin-type copolymers having the structure

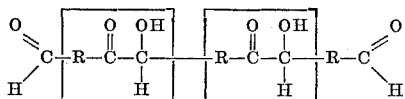

where R can be as defined in Formula 1, in which the recurring units $m$ and $n$ can contain unlike R groups. The benzoin-type copolymers have utility as coatings and can be cross-linked for bonding together layers of glass fabric.

---

This application is a divisional of application Ser. No. 328,099, filed Dec. 4, 1963.

This invention relates to benzoin-type polymers. It is more particularly directed to benzoin-type polymers having the structure (1) 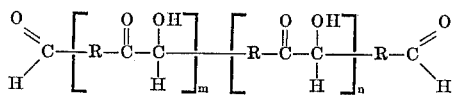

where R can be

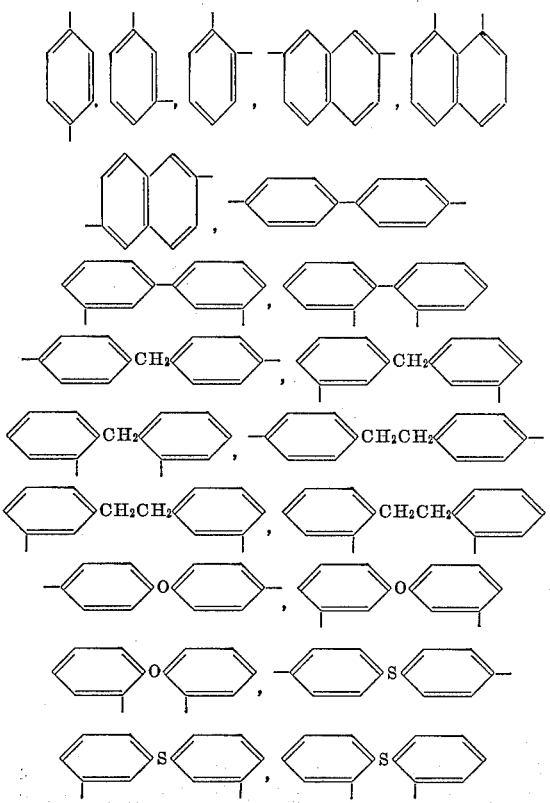

By "polymers" is meant homopolymers having the structure shown in Formula 1, and also the corresponding copolymers having the structure (2) 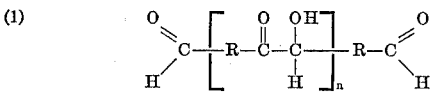

where R can be as defined in Formula 1, in which the recurring units $m$ and $n$ can contain unlike R groups. These recurring units can be arranged in a random or ordered fashion.

Utility

The polymers of the invention can be cured by heating them to temperatures of from 90–250° C. for periods ranging from several minutes to several hours. This heating causes the polymers to cross-link. The resulting products have great thermal stability and high melting points, and are insoluble in such powerful solvents as dimethylformamide, dimethylsulfoxide, dimethylacetamide and hexamethylphosphoramide, even on prolonged heating.

These properties make the polymers of the invention useful as resins for preparing glass fabric laminates to be used in high temperature applications. The polymers are also useful in preparing heat stable finishes on electrical apparatus and finishes on other articles subjected to heat in use.

Glass fabric laminates can be made by first preparing a 20–60%, by weight, solution of an uncured polymer of the invention in a solvent such as dimethylformamide. Glass fabric is impregnated with this solution and the solvent is then evaporated at a temperature below the cure temperature of the polymer. The glass fabric is then laminated, under pressure, at a temperature of from 100–250° C. The resulting product is a rigid material, having a high degree of heat stability and great resistance to tearing and fatigue on bending.

Coating compositions can be prepared from the polymers of the invention by dissolving enough polymer in a suitable solvent such as dimethylformamide or dimethylsulfoxide to give a 10–50%, by weight, solution. This solution can then be applied by ordinary techniques to the object to be coated. The solvent is evaporated to give a tough film of the polymer. If desired, the coated object can be heated to cross-link the polymer and give a thermally-stable durable finish.

All polymers having the structure shown in Formula 1, where R, stated broadly, is a divalent aromatic hydrocarbon radical or a divalent aromatic bis-hydrocarbon radical having an ether, thioether or alkylene (branched or straight chain) bridge are useful for the purposes just described.

Preferred for these uses are polymers according to Formula 1 where R is

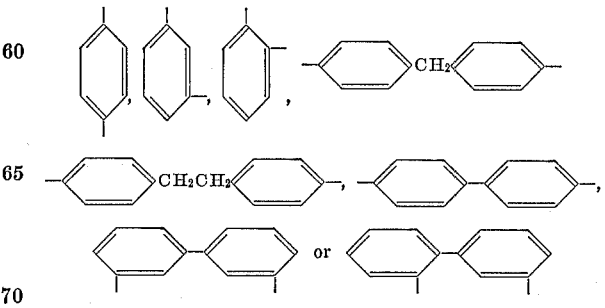

Most preferred because of the availability of the starting materials used in preparing them are polymers according to Formula 1 where R is

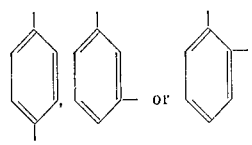

A polymer corresponding to that shown in Formula 1 where R is

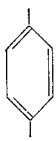

has been prepared by Jones and Tinker. This is set forth in J. Chem. Soc., 1955, 1286. This polymer, however, is of low molecular weight and does not form a measurably viscous solution in dimethylformamide. The polymers of this invention, on the other hand, have relatively high molecular weights and have inherent viscosities, (0.5% solution in dimethylformamide at 25° C.) greater than 0.05. These differences in molecular weight and inherent viscosity spell the difference between a polymer which is useful for the utilities described and one which is not.

Inherent viscosity is measured according to standard techniques as described in polymer textbooks, e.g., W. R. Sorenson and T. W. Campbell, "Preparative Methods of Polymer Chemistry," Interscience Publishers, Inc., New York, 1961.

*Preparation of the polymers*

The polymers of the invention can be prepared according to the following illustrative equation:

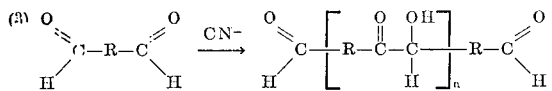

where R is as described for Formula 1.

The dialdehyde reactants used in this reaction can be prepared according to the following general schemes:

(4) $CH_3-R-CH_3 + 4Cl_2 \rightarrow Cl_2CH-R-CHCl_2 + 4HCl$
$Cl_2CH-R-CHCl_2 + 2H_2O \rightarrow HCO-R-OCH + 4HCl$
(5) $ClCH_2-R-CH_2Cl + $ hexamethylenetetramine
$+ H_2O \rightarrow OHC-R-CHO$ In the method of Equation 3, a dialdehyde reactant is dissolved or suspended in a suitable solvent, which is then heated for a time at a temperature up to about 150° C. The resulting solution contains the desired polymer, which can be separated by precipitation if desired.

The reaction should be run in a medium which can dissolve the resulting polymer. Such solvents as dimethylformamide, dimethylsulfoxide, dimethylacetamide and hexamethylphosphoramide are suitable. If other media are used, low moleucular weight polymers precipitate prematurely. Such polymers are unsuited for the uses described.

It is essential that a cyanide salt catalyst be used to promote polymerization. Such cyanide salts as sodium cyanide, potassium cyanide, lithium cyanide and barium cyanide are satisfactory. However, cyanide salts which are derived from weak bases such as trimethylamine, triethylamine, triisopropylamine, monoethanol diethylamine, ammonia and similar bases give substantially faster reactions.

When cyanide salts derived from weak bases are used as catalysts, they can be prepared in situ by adding hydrocyanic acid and the weak base to the reaction mass. If a completely uncross-linked polymer is desired, the catalyst is prepared in this way using an HCN:base mol ratio of 1:5 to 1:1. If a partially cross-linked polymer is desired, the catalyst is prepared using an HCN:base mol ratio of from 1:1.1 to 1:1.5, or even higher.

In either event, the catalysts are used in the reaction at concentrations of from 0.3 mol percent to 5 or even 10 mol percent, based on the aldehyde reactant. Preferably, the catalysts are used at concentrations of 0.5 to 1.2 mol percent.

The polymerization itself can be carried out by dissolving or suspending a dialdehyde reactant in a suitable reaction medium, to a concentration of up to about 50% by weight. If a concentration greater than this is used, the viscosity of the solution after the polymer has been formed becomes a problem. This solution or suspension is then heated to a temperature of up to about 150° C., and is held at that temperature for from ½ to 100 hours.

After polymerization is complete, the cyanide catalyst should be removed by adding a small amount of acetic or formic acid to the solution. This solution can then be used directly for the utilities previously described.

If a solid polymer is desired, it can be obtained by precipitating it from solution with 10 volumes of water and filtering it off.

Alternatively, the polymers of the invention can be prepared by melt polymerization. In this procedure, the aldehyde reactant is melted and 0.5 to 5 mol percent of a cyanide catalyst, soluble in the molten dialdehyde phase, is added. Such a catalyst is tetraethylammonium cyanide.

Melt-polymerization is carried out at a temperature ranging from slightly above the melting point of the dialdehyde reactant up to about 290° C. The time required for completion naturally depends on the temperature used, but the reaction is generally complete in about two hours. Prolonged heating must be avoided if a polymer free of cross-linking is desired.

The resulting polymer, after cooling to room temperature, is a solid which can be freed of the cyanide catalyst by powdering and washing it with water. This polymer can be readied for use by dissolving it in a suitable solvent.

The copolymers of Formula 2 can be prepared in essentially the same fashion, using a mixture of dialdehydes rather than only one.

The invention will be more easily understood and readily practiced by referring to the following ilustrative examples:

Example 1

Fifty parts of terephthaldehyde are suspended in 100 parts of dimethylformamide. This suspension is then blanketed with nitrogen and stirred at room temperature.

Two-tenths part of hydrocyanic acid and 0.35 part of triethylamine are added to the suspension, which is then stirred at room temperature for about 18 hours.

During this period, a homogeneous, light-brown, slightly viscous solution forms. The reaction mixture is then heated for about 24 hours at 45–50° C. to give a polymer having an inherent viscosity of 0.15 (measured at 25° C. on a 0.5% solution of the polymer in dimethylformamide.)

After 100 hours of heating, a polymer having an inherent viscosity of 0.35 is obtained.

The cyanide catalyst is removed from the solution by adding 0.2–5 parts of acetic acid. This solution can then be used directly as a coating composition.

If a solid polymer is desired, it can be precipitated from this solution by adding the solution to 10 volumes of water. The resulting light-yellow polymer can be filtered from the solution and dried at 60° C.

This polymer has the structure

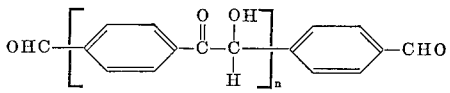

The polymers listed in the following table can be prepared in a similar fashion by substituting the listed dialdehydes, in the same proportions, for terephthalaldehyde, and the listed reaction media for dimethylformamide:

| Dialdehyde | Reaction Media | Product | Inherent Viscosity After 24 hours Waiting |
|---|---|---|---|
| OHC-C₆H₄-CHO (para) | Dimethylsulfoxide | [-C₆H₄-C(OH)(H)-]ₙ with CHO groups | 0.16 |
| OHC-C₆H₄-CHO | Dimethylacetamide | [-C₆H₄-C(OH)(H)-]ₙ with CHO groups | 0.12 |
| OHC-C₆H₄-CH₂CH₂-C₆H₄-CHO | Dimethylformamide | [-C₆H₄-CH₂CH₂-C₆H₄-C(OH)(H)-]ₙ with CHO | 0.26 |
| OHC-C₆H₄-CH₂-C₆H₄-CHO | do. | [-C₆H₄-CH₂-C₆H₄-C(OH)(H)-]ₙ with CHO | 0.40 |
| OHC-naphthalene-CHO | do. | [-naphthyl-C(OH)(H)-]ₙ with CHO | 0.16 |
| OHC-C₆H₄-O-C₆H₄-CHO | do. | [-C₆H₄-O-C₆H₄-C(OH)(H)-]ₙ with CHO | 0.24 |
| OHC-C₆H₄-S-C₆H₄-CHO | do. | [-C₆H₄-S-C₆H₄-C(OH)(H)-]ₙ with CHO | 0.45 |
| OHC-naphthalene-CHO | do. | [-naphthyl-C(OH)(H)-]ₙ with CHO | 0.38 |

Example 2

Ten parts of terephthalaldehyde are blanketed with nitrogen and then mixed with 0.15 part of tetraethylammonium cyanide. After heating for six hours at 196° C. under nitrogen, the reaction mixture is allowed to cool to room temperature. The resulting solid is powdered, washed with water and then dried to give a light-brown polymer having the structure

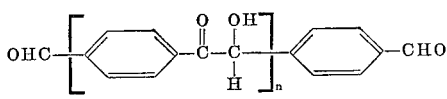

This polymer has an inherent viscosity of 0.14 as measured on a 0.5% solution in dimethylformamide at 25° C.

Example 3

A 30% solution of the polymer prepared in Example 1 in dimethylformamide is sprayed on a glass plate. The dimethylformamide is allowed to evaporate and the plate is then heated to 250° C. for from 10 to 15 minutes.

The resulting clear film is insoluble in dimethylformamide and does not melt at temperatures up to 500° C.

Example 4

Twenty-five parts of terephthalaldehyde and 25 parts of isophthalaldehyde are suspended in 50 parts of dimethylformamide and the solution is blanketed with nitrogen. Two parts of HCN and 3.5 parts of triethylamine are then added to the reaction mixture.

After several hours of stirring at room temperature, the reaction mixture becomes homogeneous and slightly viscous. This mixture is stirred for 18 more hours and then heated at 45° C. for an additional 18 hours.

The resulting viscous solution can be used directly as a coating composition, or if the solid polymer is desired, it can be obtained by precipitating it with 500 parts of methanol or water, filtering it off and drying it.

The structural formula of this copolymer is

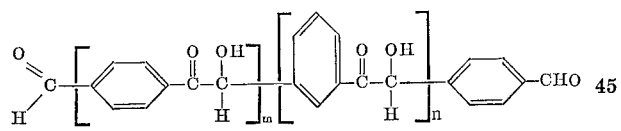

Example 5

A 25% solution of the polymer prepared in Example 1, in dimethylformamide, is applied to a glass fabric by dipping. The solvent is then evaporated at 100–150° C.

A 10-ply laminate is prepared from this impregnated glass fabric by layering it and pressing the layers together at a pressure of 200 p.s.i. and a temperature of 250° C.

This laminate has excellent heat stability and resistance to tearing.

What is claimed is:

1. A copolymer selected from the group consisting of random copolymers and ordered copolymers having the structure

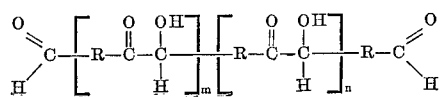

where R is selected from the group consisting of

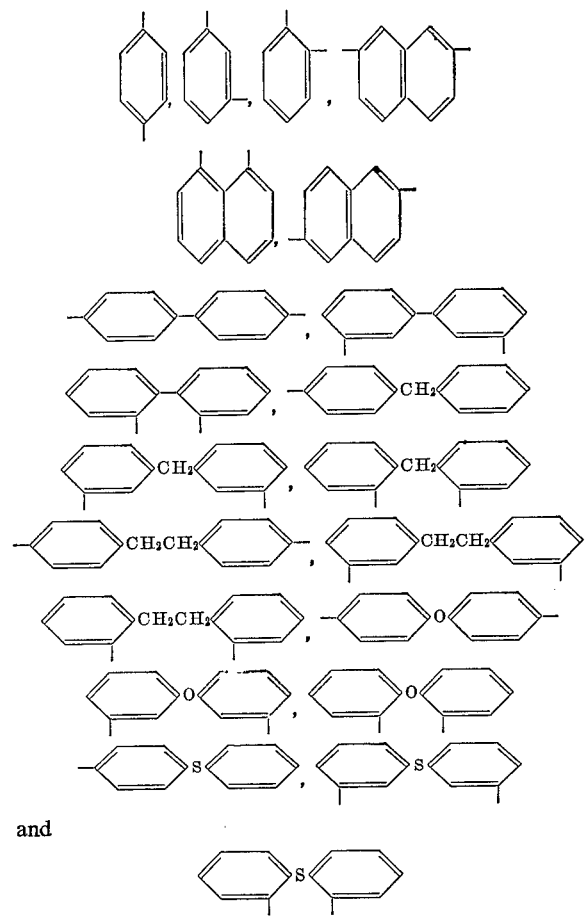

and

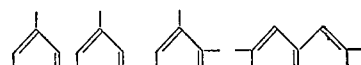

the recurring units of said copolymer having unlike R groups and wherein $m$ and $n$ are recurring units of the polymer.

2. A coating composition according to claim 1 and a solvent therefor.

3. A laminate comprising layers of glass fabric bonded together with a copolymer according to claim 1 which has been cross-linked.

References Cited

UNITED STATES PATENTS 3,166,532 1/1965 Sweeny _____ 260—67
3,215,675 11/1965 Koral et al. _____ 260—67

OTHER REFERENCES

Jones et al.: J. Chem. Soc. (London) pp. 1286 and 1287, (1955).

Gillman: Organic Chem., An Advanced Treatise, vol. 3, Pub. by John Wiley and Sons, Inc., N.Y. (1953) pp. 111 and 112.

ROBERT F. BURNETT, *Primary Examiner.*

WILLIAM J. VAN BALEN, *Assistant Examiner.*

U.S. Cl. X.R.

117—126; 260—67